United States Patent [19]
Bickel

[11] 3,828,178
[45] Aug. 6, 1974

[54] TAILLIGHT ASSEMBLY

[76] Inventor: Quentin D. Bickel, 204 S. Papago Cir., Tempe, Ariz. 85281

[22] Filed: Sept. 18, 1973

[21] Appl. No.: 398,441

[52] U.S. Cl............ 240/7.1 R, 240/7.55, 240/8.3, 240/57, 340/99, 340/134
[51] Int. Cl............................................ B60q 1/30
[58] Field of Search.......... 240/DIG. 7, 7.1 R, 7.55, 240/8.3, 57, 58; 340/99, 100, 101, 102, 119, 134

[56] References Cited
UNITED STATES PATENTS

| | | | |
|---|---|---|---|
| 1,554,808 | 9/1925 | Gatti | 240/8.3 |
| 1,670,011 | 5/1928 | Smith | 240/DIG. 7 |
| 2,738,413 | 3/1956 | Knapp | 240/7.1 R |
| 3,005,382 | 10/1961 | Weber | 240/8.3 X |
| 3,046,388 | 7/1962 | Shinn | 240/8.3 |
| 3,096,026 | 7/1963 | Bruce et al. | 240/7.1 R |

Primary Examiner—Fred L. Braun
Attorney, Agent, or Firm—William H. Drummond; Don J. Flickinger

[57] ABSTRACT

A taillight assembly for a vehicle has a translucent enclosure having red light transmitting front, side and top areas and a white light transmitting bottom area. The front area has a reflector thereon. A reflective hood extends upwardly forward over the enclosure.

1 Claim, 10 Drawing Figures

PATENTED AUG 6 1974 3,828,178

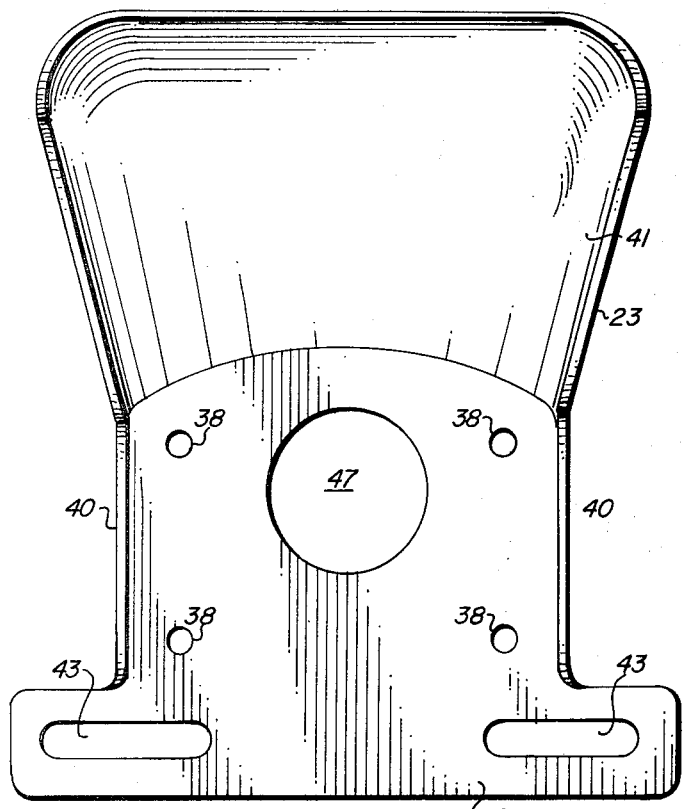
FIG-6
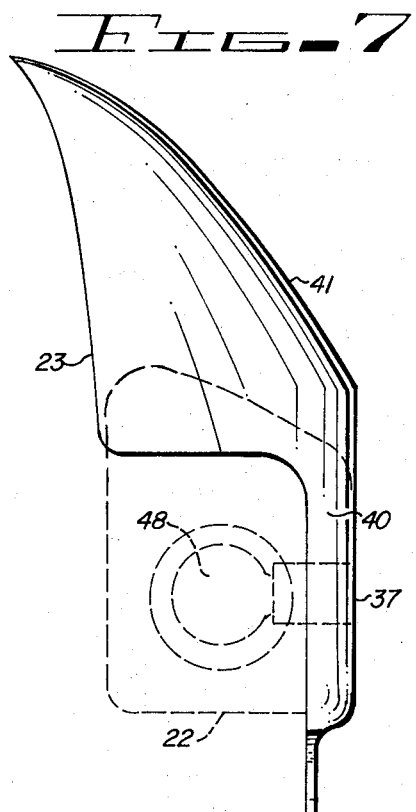
FIG-7
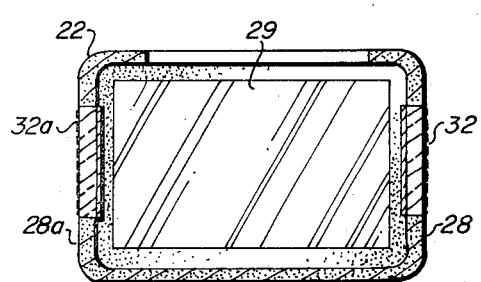
FIG-4
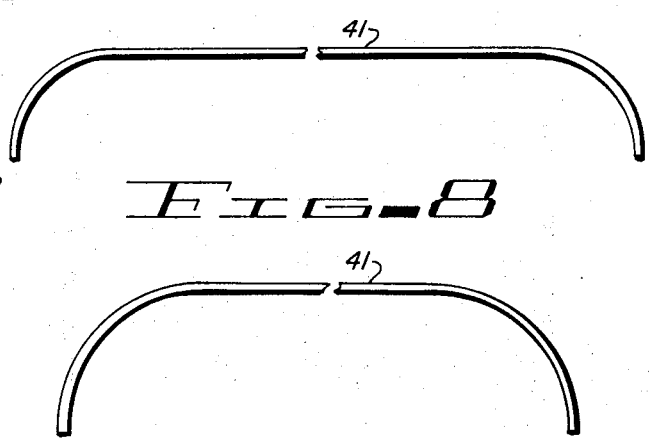
FIG-8
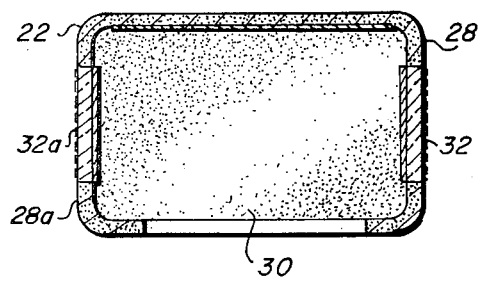
FIG-5
FIG-9
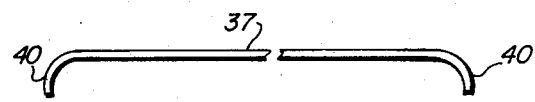
FIG-10

TAILLIGHT ASSEMBLY

This invention relates to vehicle accessories.

More particularly, the invention relates to a lighted safety device of the type carried upon the rear of a vehicle.

In a further aspect, the invention concerns an improved taillight combining direct and reflected light for increased display of the presence of a vehicle.

The so-called rear-end collision wherein one vehicle strikes another from behind is extremely common. While this type of accident can be attributed to several determinants, the more predominant causes include inattention of the driver behind, inability of the driver to perceive the vehicle ahead, and inadequate warning from the vehicle ahead that it is slowing or stopping.

The driver of an approaching vehicle is generally dependent upon the physical size or rear-mounted signalling devices of the vehicle ahead to perceive the vehicle or anticipate the maneuvers thereof. Ambient conditions which impair visibility materially enhance the conditions conducive to rear-end collisions, even among careful and attentive drivers. Sun glare, for example, can negate the light from taillights, stoplights or other warning devices of the vehicle ahead, or possibly obscure the entire vehicle. During periods of reduced natural light, such as adverse weather conditions or darkness, the driver must rely upon the headlights of his vehicle or signal devices upon the rear of the vehicle ahead. Frequently, insufficient light is generated or reflected due to dim headlights or inadequate signal devices. This is especially prevalent with smaller vehicles, including bicycles and motorcycles, which lack the physical size either to be readily seen or have adequate sized rear warning devices mounted thereon.

It would be highly advantageous, therefore, to provide an improved taillight assembly to assist the driver of an approaching vehicle in perceiving the vehicle ahead.

Accordingly, it is a principal object of the present invention to provide an improved taillight assembly having increased brilliance.

Another object of the invention is the provision of an improved taillight assembly which can be more readily seen during adverse ambient conditions.

Still another object of the invention is to provide a taillight assembly which transmits direct and reflected light.

Yet still another object of the invention is to provide a taillight assembly which incorporates novel means for increasing the visibility of the direct light produced by the light source within the assembly.

Yet still another object of the invention is the provision of a taillight assembly which is adapted to function as an improved stoplight.

A further object of the invention is the provision of an improved taillight assembly which may be readily and easily attached to a vehicle either as a supplement to or a replacement for the original taillight assembly.

A still further object of the invention is to provide an improved taillight assembly of the above type which is durably constructed, extremely effective and yet relatively inexpensive to manufacture.

Briefly, to achieve the desired objectives of the present invention, in accordance with a preferred embodiment thereof, first provided is a generally translucent enclosure having red light transmitting front, side and top areas. The rear of the enclosure is secured to the upright portion of a reflective plate, which has a hood portion extending upwardly forwardly over the enclosure. A rearwardly directed reflector is carried upon the front area of the enclosure. A light source resides within the enclosure, as might be provided by a lamp socket carried by the reflective plate. The enclosure may also include a white light transmitting bottom area.

The foregoing and further and more specific objects and advantages of the present invention will become readily apparent to those skilled in the art from the following detailed description thereof taken in conjunction with the drawings, in which:

FIG. 4 is a horizontal section view taken along the line 4—4 of FIG. 3;

FIG. 5 is a horizontal section view taken along the line 5—5 of FIG. 3;

FIG. 6 is a frontal elevational view of the reflective plate element of the present invention;

FIG. 7 is a side view of the element of FIG. 6;

FIG. 8 is a horizontal section view of the reflective plate element taken along the line 8—8 of FIG. 2;

FIG. 9 is a horizontal cross-section of the reflective plate element taken along the line 9—9 of FIG. 2; and FIG. 10 is a horizontal cross-section of the reflective plate element taken along the line 10-10 of FIG. 2.

Figure 1:
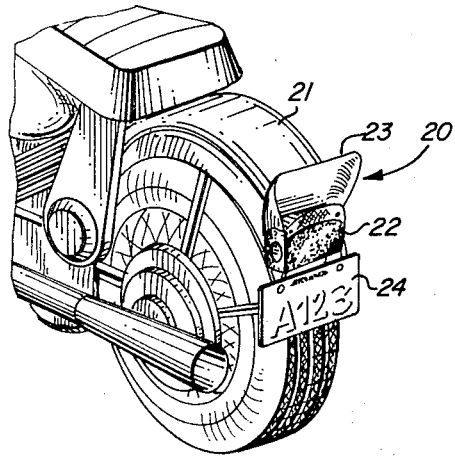
FIG. 1 is a partial perspective view of a vehicle, herein chosen for purposes of illustration as a motorcycle, having the improved taillight assembly of the present invention mounted thereon.
Figure 3:
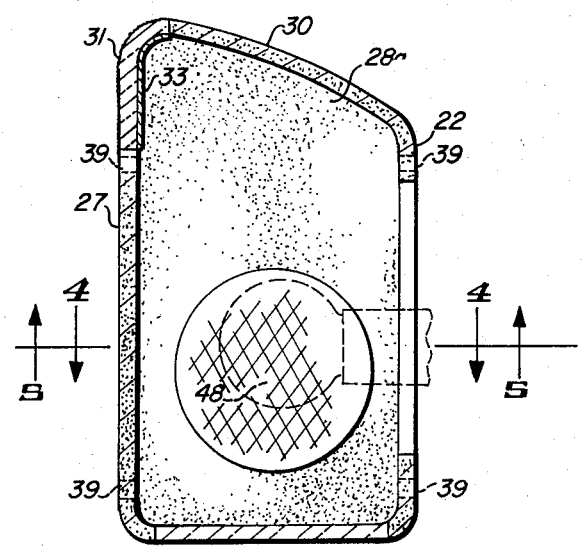
FIG. 3 is a vertical section view taken along the line 3—3 of FIG. 2 and specifically illustrating the lens arrangement of the translucent enclosure portion of the invention.

Turning now to the drawings, in which the same reference numerals indicate corresponding elements throughout the several views, attention is first directed to FIG. 1, which shows the taillight assembly of the present invention, generally designated by the reference character 20, as it would appear when attached to a motorcycle 21 in place of the original equipment taillight assembly. As seen herein and as will be described hereinafter in greater detail, the taillight assembly 20 has a generally translucent enclosure element 22 and a reflective plate member 23 extending upwardly forwardly over the translucent enclosure. A portion of the plate member 23 extends below the translucent enclosure 22 to provide a bracket to which the license plate 24 is attached. Although the taillight assembly 20 is attached to the rear of the vehicle and is directed rearwardly, it will be described for purposes of orientation as it would appear to a viewer standing behind or approaching the rear of the vehicle.

The translucent enclosure 22, as illustrated in detail in FIGS. 2–5, has a generally vertical front surface 27, generally vertical side surfaces 28, 28a, a horizontal bottom surface 29, and an arcuate rearward-sloping top surface 30. Although the enclosure 22 may be variously fabricated by methods well known in the art such as employing a frame member to support the various surfaces, it is generally preferred that the enclosure 22 be molded as a unitary element from a rigid translucent plastic.

To provide conventional taillight and stoplight signalling to the rear and sides of the vehicle, the front surface 27 and the side surfaces 28, 28a of the enclosure 22 are tinted red and are embossed on either side thereof to provide a diffused red light transmission. Reflectors 31, 32 and 32a, carried by the front surface 27 and the side surfaces 28 and 28a, respectively, provide signalling means to the rear and sides of the vehicle when the light within the enclosure is either turned off or inoperative. In accordance with the preferred method of fabricating the enclosure 22, the reflectors 31, 32 and 32a are diamond-embossed areas having a silver metallic coating on the inside thereof, as particularly seen by the coating 33 on the inner surface of the reflector 31 in FIG. 3. The bottom surface 29 is clear or white light transmitting to illuminate the license plate 24. The top surface 30 is tinted to transmit direct red light to illuminate the reflector plate 23, as will be described hereinafter in detail.

Figure 2:
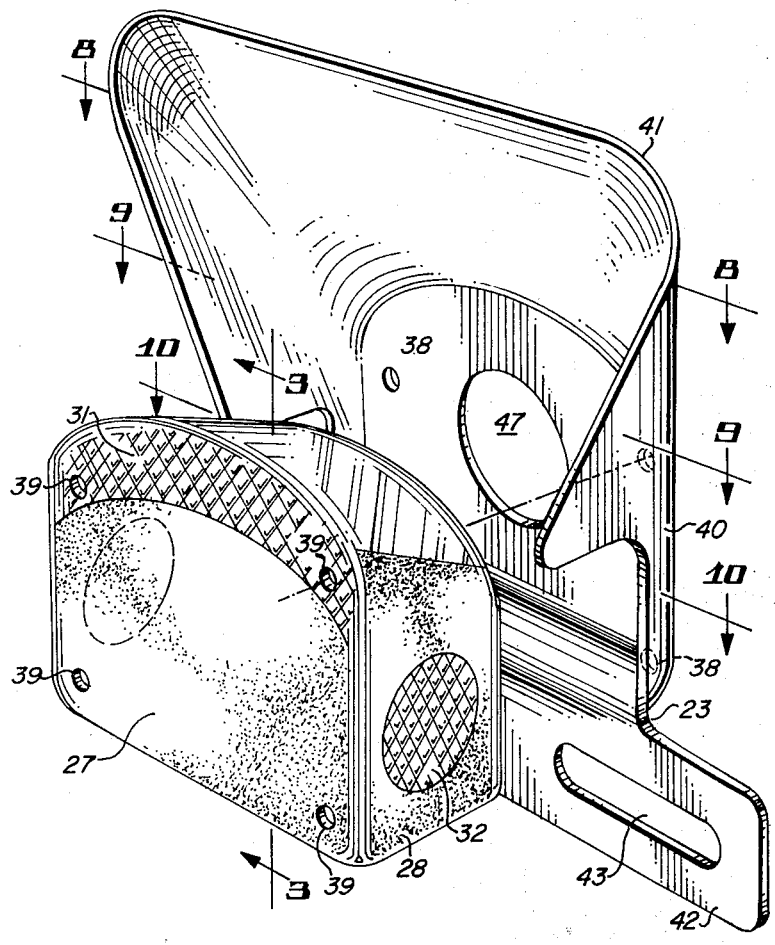
FIG. 2 is an exploded perspective view of a taillight assembly constructed in accordance with the teachings of the present invention.

The reflective plate member, as seen in FIGS. 2, 6 and 7, has an upright portion 37 to which the enclosure 22 is abutted and secured. Apertures 38 within the upright portion 37 align with corresponding apertures 39 within the enclosure 22 through which bolts may be passed to effect the securement of the enclosure 22 to the reflective plate member 23. While it is preferred that nuts be threadedly engaged with the bolts on the back side of the upright portion 37, other expediencies may also be employed. For example, the apertures 38 could be threaded to receive the bolts, or the bolts could be inserted through the apertures 38 and threadedly engage within the apertures 39. Forwardly directed flanges 40, integral with either side of the upright portion 37, provide protection to the enclosure 22 as from stones or other debris which may be directed toward the taillight assembly by the rotating tires of the vehicle. A hood portion 41 of the reflective plate member 23 extends upwardly forwardly over the enclosure 22. A further visualization of the preferred contour of the reflective plate member 23 is gained with reference to the various cross-sections as seen in FIGS. 8, 9 and 10. A bracket 42, depending from the upright portion 37, has elongate apertures 43 therethrough to facilitate attachment of the license plate.

An aperture 47 within the upright portion 37 permits a lamp 48 to extend through the reflective plate member 23 to reside within the enclosure 22 by extending through the open back thereof. The lamp 48 is representative of various lamps that may be operatively associated with the taillight assembly of the present invention. In accordance with the desires of the user, the original equipment taillight housing and lens assembly may be removed and the taillight assembly of the present invention substituted therefor, retaining the original double-filament combination taillight-stoplight. Alternately, the improved taillight assembly of the present invention may be mounted upon the vehicle in addition to the original equipment taillight assembly with an auxiliary lamp and socket arrangement secured within the aperture 47 and operatively wired into the vehicle electrical system. To accommodate the various types of mounting, the reflective plate member may be provided with bolt holes which align with the original equipment mounting bracket of the vehicle, or alternately provided with an auxiliary mounting bracket, as is well-known in the art. In the latter case, where the improved taillight assembly of the present invention is used as a supplementary lighting device, the license plate bracket 42 may be omitted.

The improved taillight assembly, as described herein, has numerous functions which result in obvious advantages over conventional taillight assemblies. During daylight hours, especially when bright glaring sunlight tends to obscure conventional taillights, the forwardly directed hood portion 23 shadows the enclosure 22 to increase the perceptibility of the activated stoplight. A more effective signalling device is accomplished at night by light rays which are cast upwardly through the top surface 30 and reflected by the hood portion 41. The upwardly directed light rays are strengthened by light which is reflected onto the hood portion 41 from the silvered portion 33 behind the reflector 31. A lesser quantity of light transmitted through the side surfaces 28 and 28a serves as side markers for the vehicle. In the event the lamp 48 is either faulty or inoperative, signalling is still accomplished to the rear and sides by the reflectors 31, 32 and 32a, respectively, utilizing the light of the approaching vehicle. Similarly, light cast upon the hood portion 41 will reflect to the driver of an approaching vehicle as a warning of the presence of a vehicle ahead.

Having fully described and disclosed the present invention and the preferred embodiment thereof in such clear and concise terms as to enable those skilled in the art to understand and practice the same, the invention claimed is:

1. A taillight assembly comprising:
   a. a generally translucent enclosure including
      i. red light transmitting front, side and top areas, and
      ii. a white light transmitting bottom area;
   b. a light source within said enclosure; and
   c. a reflective plate including
      i. an upright portion secured against the rear of said enclosure,
      ii. a bracket for securing a license plate thereto depending from said upright portion, and
      iii. a hood portion extending upwardly forward over said enclosure to substantially cover said enclosure.

* * * * *